Figure 3:
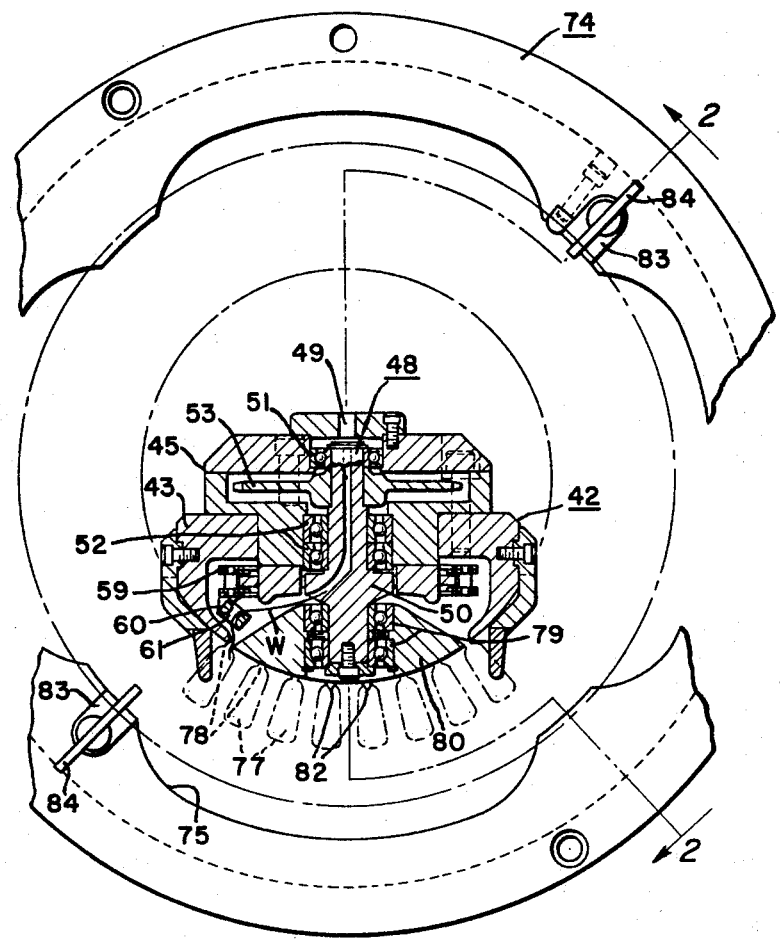

Sept. 6, 1966 P. B. GREENE ETAL 3,270,969
POLYPHASE STATOR WINDING APPARATUS
Original Filed Dec. 4, 1962 4 Sheets-Sheet 1
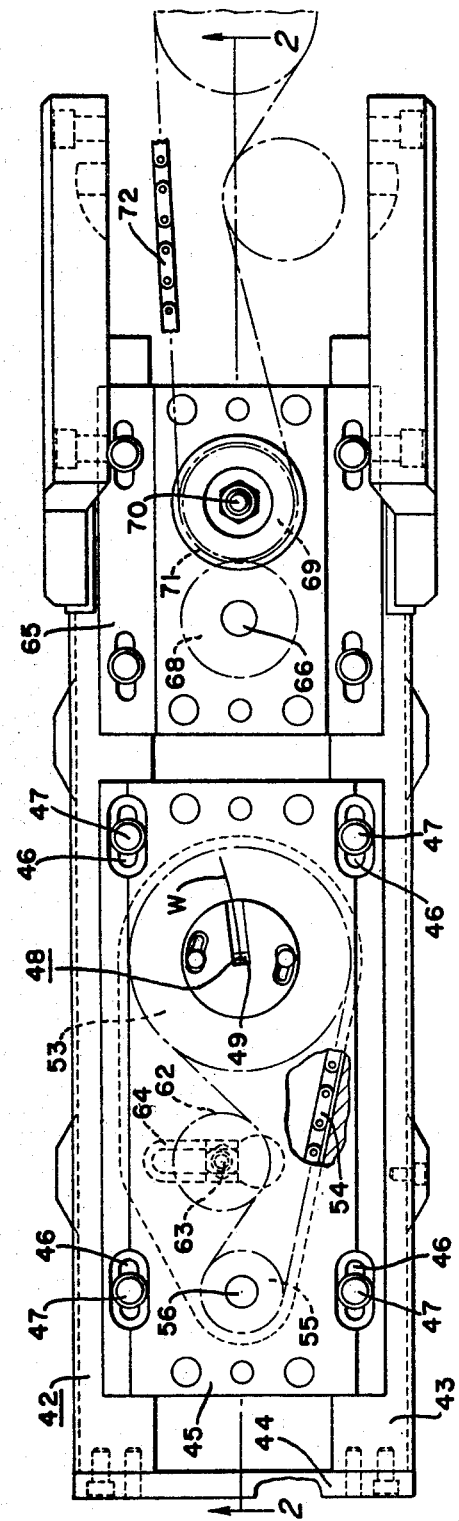
Fig. 1
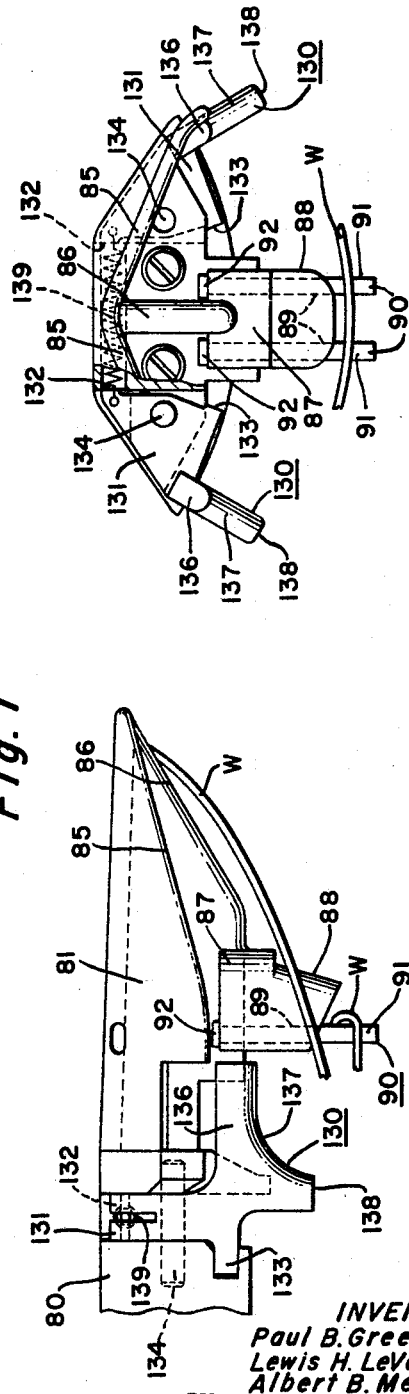
Fig. 8
Fig. 7
INVENTORS
Paul B. Greene
Lewis H. LeValley
Albert B. Mewhinney
Emmet C. Nevin
BY
Albert H. Bender
Their Attorney

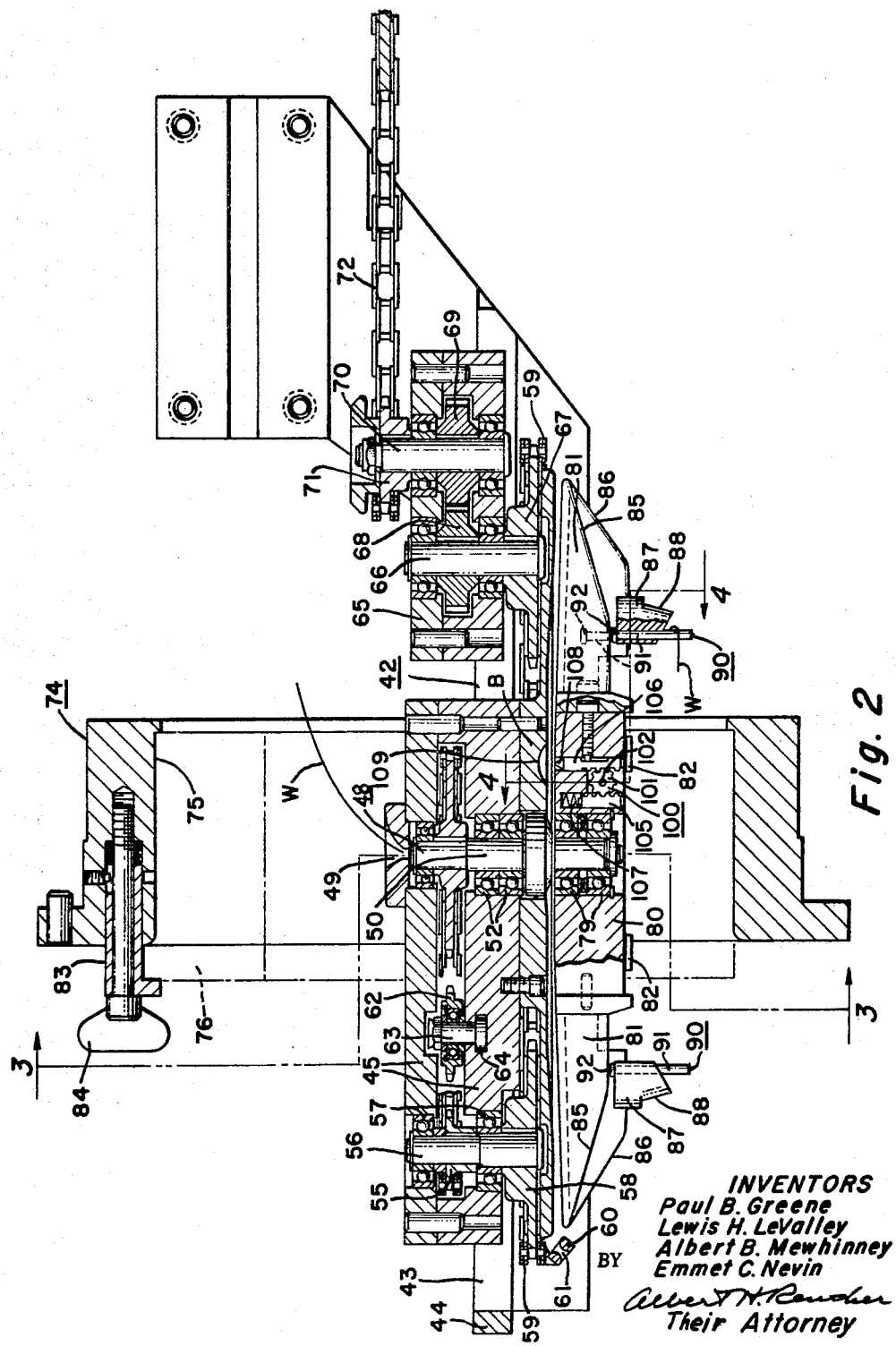

Sept. 6, 1966    P. B. GREENE ETAL    3,270,969
POLYPHASE STATOR WINDING APPARATUS Original Filed Dec. 4, 1962    4 Sheets-Sheet 3

INVENTORS
Paul B. Greene
Lewis H. LeValley
Albert B. Mewhinney
BY Emmet C. Nevin Their Attorney

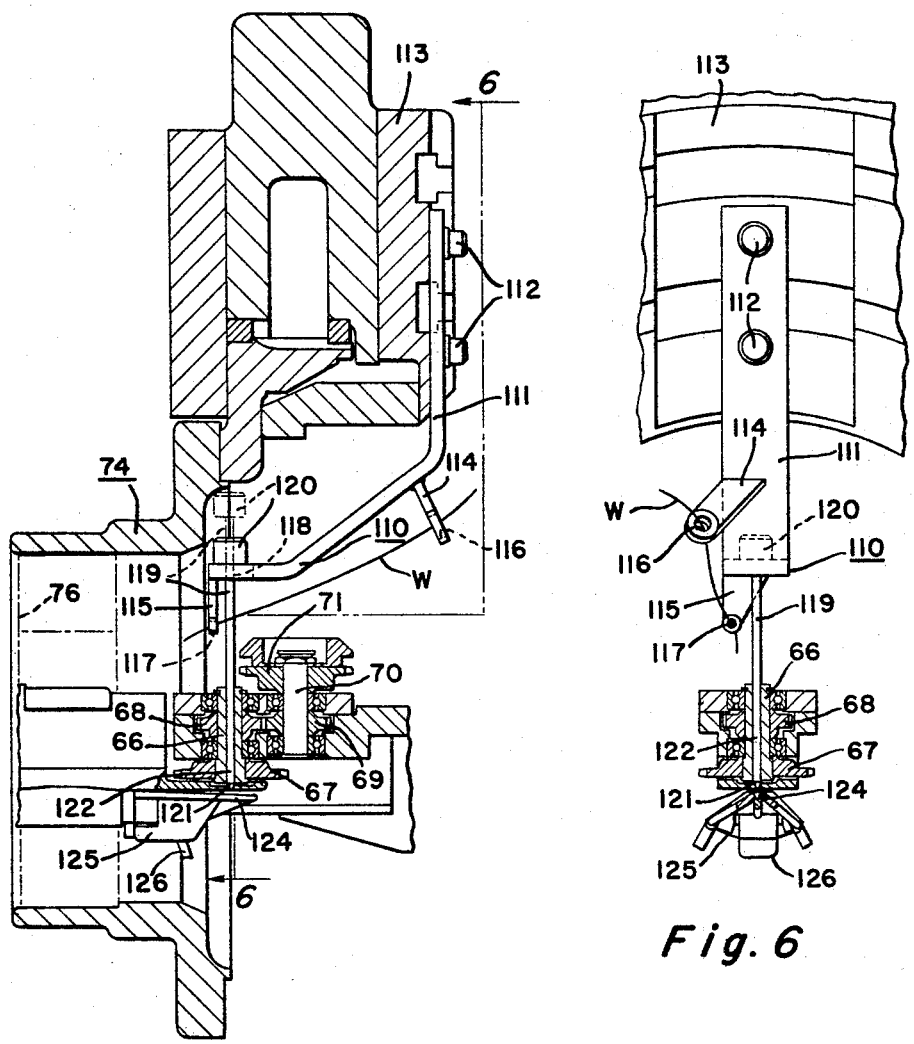

United States Patent Office 3,270,969
Patented Sept. 6, 1966

1

3,270,969
POLYPHASE STATOR WINDING APPARATUS
Paul B. Greene, Miamisburg, and Lewis H. Le Valley, Albert B. Mewhinney, and Emmet C. Nevin, Dayton, Ohio, assignors to General Motors Corporation, Detroit, Mich., a corporation of Delaware
Original application Dec. 4, 1962, Ser. No. 242,236, now Patent No. 3,210,020, dated Oct. 5, 1965. Divided and this application Nov. 2, 1964, Ser. No. 408,040
5 Claims. (Cl. 242—1.1)

This is a division of copending application of Serial Number 242,236, filed December 4, 1962, now Patent 3,210,020, Greene et al., issued October 5, 1965, to the assignee of the present invention.

This invention relates to features in combination with wire wniding apparatus, and more particularly, to refinements and improvements for a stator coil winding machine of the type disclosed by Patent 2,988,291, Greene et al., issued June 13, 1961 and belonging to the assignee of the present invention.

An object of this invention is to provide retractable interlocking means to prevent lateral shifting and turning of a cantilever winding head structure provided with chain-driven wire-guiding means therewith.

Another object of this invention is to provide a stator coil winding head structure having opposite wire-guiding shoe portions to facilitate progressive placement of conductor coils in stator slots from which end turns of coils extend and are formed by at least one of a pair of vertically retractable pin-like posts around which the conductor is guided and is adapted to form end turns therewith free of damage to the conductor coil end turns previously wound.

Another object of this invention is to provide a stator coil winding head structure having opposite wire-guiding shoe portions each provided with diverging edging at least a portion of which is defined by separate pivotal hinge-like members remote from each other in pairs though each having a triangular main body portion with a pair of stops to limit angular pivotal movement as to the shoe portion as well as having a substantially L-shaped curved guide edge portion extending transversely of the triangular main body portion and complementing the edging of each side of the shoe portion, each substantially L-shaped curved guide edge portion being displaceable during placement of wiring so as to enhance generally even distribution thereof into stator slots.

Further objects and advantages of the present invention will be apparent from the following description, reference being had to the accompanying drawings wherein preferred embodiments of the present invention are clearly shown.

Figure 4:
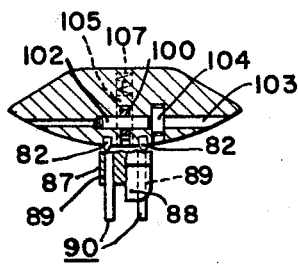

In the drawings:
FIGURE 1 is a plan view of a cantilever winding head structure having features in accordance with the present invention.
FIGURE 2 is a cross-sectional view taken along line 2—2 in FIGURE 1.
FIGURE 3 is a cross sectional view taken along line 3—3 in FIGURE 2.
FIGURE 4 is a cross-sectional view taken along line 4—4 in FIGURE 2.
FIGURE 5 is a partially sectioned side view of a modified winding head structure having further features in accordance with the present invention.
FIGURE 6 is a cross-sectional view taken along line 6—6 in FIGURE 5.
FIGURE 7 is a side view of another embodiment of a wire-guiding shoe portion usable with the winding head structures of the foregoing views.

2

FIGURE 8 is an end view of the wire-guiding show portion of FIGURE 7.

Polyphase windings generally require placement of more conducting material or wiring into radially-slotted magnetic stator core means which can be formed by a stack of metal laminations aligned axially relative to each other. Recently there has been a trend toward compactness of dynamoelectric machine structures and such a trend results in increased difficulty as to placement of conductor material or wiring into slots of slotted magnetic stator core means adapted for polyphase dynamoelectric machines. Furthermore, there is a need for increased mechanization of polyphase winding operations so as to avoid loss of time and considerable expense involved in manual operation previously known for accomplishing placement of conductor material or wiring for polyphase winding of stator means. However, problems encountered in providing for machine winding of polyphase stator means differ somewhat from solutions provided for mechanical and machine placement of conductor material or wiring relative to slotted stator means generally. Therefore, refinements and improvements were made for a stator coil winding machine disclosed basically in Patent 2,988,291, Greene et al., issued June 13, 1961 and belonging to the assignee of the present invention. This disclosure of Patent 2,988,291, Greene et al., was also supplemented in accordance with teaching of a copending application Serial No. 11,654, Greene, filed February 29, 1960, now Patent 3,129,491, Greene, issued April 21, 1964, relating to insulating cutting and insertion mechanism in combination therewith as well as a copending divisional application thereof Serial No. 145,418, Greene, filed October 16, 1961, now Patent 3,129,499, Greene, issued April 21, 1964, and directed to positive driving generally for a wire placing guide means. Both of these copending applications belong to the assignee of the present invention and features disclosed in this application can be used with structures previously described and illustrated in these earlier disclosures.

Thus, in FIGURE 1 there is illustrated a plan view of a cantilever winding head portion or structure generally indicated by numeral 42 and adapted to be movable into and out of engagement with an inner periphery of an annular slotted stator means or magnetic core subject to indexing movement as disclosed in Patent 2,988,291, Greene et al. This winding head structure 42 includes an outer frame 43 having a transverse end portion 44 as well as a longitudinally adjustable bracket 45. The bracket 45 is provided with plural slots 46 through which suitable fastening means such as indicated by reference numeral 47 in FIGURE 1 can be adjustably fitted therewith in accordance with disclosure of copending applications S.N. 11,654, Greene and S.N. 145,418, Greene, now Patents 3,129,491, Greene and 3,129,499, Greene respectively, noted earlier. As can be seen in views of FIGURES 1 and 2 as well as in the aforementioned earlier disclosures, such bracket means 45 can be fitted with a snorkel member generally indicated by numeral 48 having a central guide passage for wiring or conductor means. This guide passage is indicated by numeral 49 and can include a laterally outwardly or radially extending extension thereof to facilitate movement of conductor material or wiring therethrough. This passage 49 can extend through an axial body portion 50 of the snorkel member 48 as indicated in FIGURE 2 such that suitable bearing means 51 and 52 press fitted in an annular opening between the body portion and bracket 45 can permit movement of the snorkel member 48 rotatably about a complete 360° path about the axis of body portion 50 thereof. A sprocket or gear means 53 having peripheral teeth engaged by a link chain means 54 can be carried to be movable relative to the bracket 45 as permitted by journalling of the bearings noted earlier. The chain means 54 provides a positive driving connection to the gear member or sprocket 53 and snorkel means 48 by way of a further sprocket or gear means 55 carried on a shaft portion 56 suitably journalled by bearings 57 and carrying another sprocket or gear means 58 having another chain means 59 with a wire-guiding eyelet 60 including a passage 61 therethrough carried by the chain means 59 as indicated in FIGURE 2. The chain 54 can be adjusted for proper engagement between sprockets 53 and 55 by an adjustable gear means 62 journalled relative to a suitable support subject to variable positioning in accordance with access to a fastening means 63 movable in an undercut groove 64 in the bracket 45 which can be divided into separable cover and main body portions for assembly purposes.

A further bracket means 65 visible in views of FIGURES 1 and 2 can be also adjustably positioned along the frame 43 or an extension thereof so as to provide rotatable journalling and support for a shaft portion 66 that carries a sprocket or gear means 67 engaged by the chain 59 as well as a gear means 68 in mesh with further gear means 69 carried by a suitably journalled shaft portion 70 having a sprocket 71 driven by a chain means 72 in a manner described more fully in the disclosure of Patent 2,988,291, Greene et al.

The winding head structure 42 as well as the snorkel member 48 can also be seen in the view of FIGURE 3. In FIGURES 2 and 3 there is indicated an annular support means generally indicated by numeral 74 and provided with a radially inner recess 75 to receive a stator means 76 having radially inwardly located slots 77 therein. These slots 77 have inner openings 78 through which conductor material or wiring must be fed by way of the passage 61 in the eyelet 60 and the central passage 49 of the snorkel member 48 so as to permit machine-operated placement of such conductor material or wiring as coils and windings of a polyphase stator winding assembly on a dynamo-electric machine. As can be best seen in views of FIGURES 2 and 3, the body portion 50 of the snorkel member 48 at a lower end thereof is fitted with bearing means 79 to provide journalling support for a central or intermediate portion 80 of a guide shoe means that further includes opposite end portions 81 substantially identical to each other and secured to the intermediate portion 80 by a suitable fastening means. The intermediate portion 80 can include at least a pair of downwardly extending projections 82 indicated in FIGURE 3 and these projections 82 can fit complementary to inner slot openings such as 78. These projections 82 extend longitudinally of the inner slot openings 78 and it is to be understood that a stator means 76 is held to the annular support 74 by a clamp means 83 with an adjustable fastener 84 as indicated in views of FIGURES 2 and 3. Thus, the stator means 76 is held axially relative to the recess 75 and the winding head structure 42 is positioned longitudinally thereof in a cantilever arrangement of support from a main body, frame or base of the stator winding machine to which the support 74 is fixed. The winding head structure 42 can be moved into and out of engagement with the inner periphery of the stator means 76 as described more fully in Patent 2,988,291, Greene et al., where means are disclosed for providing a vertically reciprocating shifting movement to a winding head. For polyphase stator winding apparatus, it has been found that the intermediate shoe portion 80 carrying the opposite end shoe portions 81 can have a tendency to move or rotate in such a way that the projections 82 are not always longitudinally in alignment with a particular pair of inner slot openings 78. Proper positioning of the wire guiding shoe portions 80–81 is necessary to assure placement of conductor material or wiring W into predetermined pairs of arcuately separated slots in the stator means. This proper longitudinal alignment of the wire guiding shoe portions 80–81 is also essential for formation of opposite end turns of wiring due to engagement thereof along laterally opposite peripheral edging 85 and central rib 86 of the winding shoe end portion 81 visible in views of FIGURES 2, 7 and 8 of the drawings. A lower or downwardly extending projection 87 including a rounded or curved end guide surface 88 engageable by wiring W can be provided on each of the wire guiding end portions 81. Each extension 87 can have a pair of parallel passages 89 therethrough. Post-like pin means generally indicated by numeral 90 can be provided to include a main body portion 91 and an upper enlarged head 92 to be displaceable as indicated in a right-hand portion of the view of FIGURE 2 whenever a lower free end of the pin means 90 engages previously wound wiring W of a coil of an earlier wound phase portion of a stator means for a polyphase dynamoelectric machine. It has been found that in placement of wiring W into the stator slots that at most, one or the other of such displaceable pin means will be caused to be deflected upwardly by previously wound wiring W such that at least one post is left to project downwardly and to assure generally triangular formation of end turns of wiring W into coils of a polyphase winding on a stator means for a dynamoelectric machine. The contoured or curved surfacing 88 of the extensions 87 assures passing of the wiring W to engage either of the post-like pin means 90 and machine placement of such wiring W can be accomplished successfully by turning of the wiring about one or both of the reciprocable and displaceable pin means 90. Weight of the pin means and clearance for the axial body 91 thereof relative to the passages 89 is such that the pin means tend to be positioned downwardly under normal conditions except for displacement upon engagement of an end of such a pin means against a previously wound end turn of a coil of wiring or conductor material.

On larger polyphase stator winding apparatus there can be provided a retractable interlocking means generally indicated by numeral 100 in views of FIGURES 2 and 4. This retractable interlocking means 100 can include a gear 101 rotatably journalled on a pin or shaft 102 inserted through a passage 103 in the intermediate shoe portion 80. The passage 103 can be blocked or closed off by a transverse dowel 104 as indicated in FIGURE 4. The gear 101 is located between a pair of oppositely movable rack or geared portions 105 and 106 as can be best seen in the view of FIGURE 2. The rack portion 105 is biased downwardly by a spring means 107 visible in views of FIGURES 4 as well as 2 such that normally the spring means 107 urges the rack portion 105 downwardly to effect displacement of the rack portion 106 upwardly in a couple-like arrangement resulting in interlock or engagement of an upper end 108 in a dome-like recess 109 of a transverse body portion B carried by the frame 43 as indicated in FIGURE 2. Movement of the winding head structure 42 radially into engagement with an inner periphery of a stator means results in engagement of a lower end of the rack portion 105 against an inner periphery of the stator means thereby causing a disengagement of the upper end 108 of the rack portion 106 which is thus freed from centralizing engagement as to the dome-like recess 109 thereby permitting free alignment of the projections 82 relative to inner slot openings 78. As soon as the winding head structure 42 is retracted radially inwardly away from engagement with the stator means, the spring means 107 again urges a rack portion 105 downwardly thereby providing a translation of this force through the rotatable gear 101 that urges the rack portion 106 upwardly to have the free end 108 interlock with the dome-like recess 109 of the transverse body portion B thereby effecting an interlock or engagement between the wire-guiding shoe means 80–81 and the winding head structure 42. This interengagement or interlock assures against undesirable free turning of the wire guiding shoe portions 80–81 relative to the winding head structure 42 whenever the latter is retracted from engagement with a stator means such as 76. Thus, the wire guiding shoe portion structure 80-81 can be centered relative to the head structure 42 due to use of the spring-loaded plunger-like rack portion 105-106 reciprocably displaced in response to engagement of the lower projecting end of the rack portion 105 against an inner periphery of a slotted stator means.

A similar retractable interlocking means for use on smaller polyphase stator winding apparatus and the like can be seen in another embodiment thereof illustrative by views of FIGURES 5 and 6 of the drawings. This interlocking means is generally indicated by numeral 110 and includes a substantially L-shaped bracket or fixed arm means 111 held by fastening means 112 secured as shown in FIGURES 5 and 6 to a frame or main body 113 of a stator winding apparatus which has a fixed predetermined vertical position relative to a means for vertically reciprocating the winding head means as described in the aforementioned patent to Greene et al., 2,988,291. The bracket or fixed arm means 111 can include a pair of downwardly extending projections 114 and 115 which direct wiring through passages 116 and 117, respectively, thereof to a location radially inwardly from stator support means such as 74 relative to which a stator means 76 indicated in FIGURE 5 can be supported as noted earlier. A lower end of the bracket or fixed arm means 111 has a passage 118 vertically therethrough. A shiftable nail-like rod or pin member 119 having an enlarged head portion 120 on one end thereof can move reciprocably up and down axially of the passage 118 of the supporting bracket or fixed arm means 111 with a lower end 121 of the rod or pin portion 119 projecting through a passage or inner hollow core 122 of the shaft 66 which carries sprockets 67 and 68, for example. The extensions 114 and 115 having the passages 116 and 117, respectively, therethrough assure guidance of wiring W to one side of the rod or pin means 119 having sufficient weight included with the head portion 120 thereof to assure normal downward location and positioning by gravity to have the free end 121 of the rod or pin portion 119 engage a recess 124 of one wire guiding end portion 125 which can have a single pivotal finger means 126 as shown in FIGURE 5 in accordance with disclosure of FIGURES 1-3 of a copending application S.N. 18,125, filed March 28, 1960, now Patent 3,129,900, Greene, issued April 21, 1964, belonging to the assignee of the present invention. The lower end of the bracket or fixed arm means 111 and the winding head structure have a predetermined horizontal position where the winding head structure including the wire guiding shoe end portion 125 is moved vertically, such as by a cam means as described in the patent to Greene et al., 2,988,291, relative to said bracket. The end portion 125 is moved into a location immediately adjacent to a slotted stator means and there is a retention of the head portion 120 carrying the rod or pin portion 119 such that the free end 121 thereof disengages from the recess 124. However, as soon as the wire winding head structure is moved away from the slotted magnetic stator core, the free end 121 can engage the recess 124 so as to centralize and interlock the otherwise rotatable wire winding guide portions which are journalled by the snorkel member mentioned earlier such that the wire winding and guiding shoe portion is prevented from free rotation during the time that the winding head structure is moved or indexed out of engagement with the slotted stator means. The fastening means 112 can provide for adjustment of the positioning of the bracket or arm means 111 so as to have proper interfit of the free end 121 and recess 124 peripherally and centrally thereof.

In FIGURES 7 and 8 of the drawings there can be seen further refinement and improvement of features for wire guiding end shoe portions to include a pair of separately pivotable hinge-like members generally indicated by numeral 130 and each having a substantially triangular main body portion 131 with a pair of stops 132 and 133 engageable against a central portion of a wire winding end guide portion suitably recessed to accommodate the triangular body portions 131 on right and left-hand sides thereof in a location remote from a guide edging such as 85 and 86 noted earlier. It is to be noted that the triangular main body portions 131 can be journalled by a suitable shaft or pin 134 for each side and such a pin or shaft 134 can have opposite ends thereof secured for journalling between the intermediate shoe portion 80 and end portion 81 at each of opposite sides or ends of the intermediate portion 80. Integral with the triagular main body portion 131 of each of the hingle-like members 130 there can be a substantially L-shaped extension 136 having a curved guide edge portion 137 which supplements the edging 85 on laterally opposite sides so as to complement each other on each of the shoe portions though the curved guide edge portion 137 of each of the hinge-like members 130 is pivotally displaceable during wire winding operation thereby to enhance generally even distribution of the wiring W into stator slots such as 77 of the stator means 76 noted earlier. These separately hinged pivotal members 130 provide specific structural improvement to aid in wire placement utilizing such hinged members disclosed generally in a copending application S.N. 145,417, Greene, filed October 16, 1961, now Patent 3,129,901, Greene, issued April 21, 1964, and based upon a parent disclosure of application S.N. 18,125, Greene, filed March 28, 1960, now Patent 3,129,-900, Greene, issued April 21, 1964, as noted earlier. It is to be understood that the interlocking means disclosed in views of FIGURES 2 and 4 as well as 5 and 6 can be provided to prevent turning of winding head guide shoe portions about the axis of a snorkel or guide member with the provision of such pivotal members such as 130 on the end portions such as 81. Use of a recess of a conical configuration such as indicated by numeral 124, for example, in views of FIGURES 5 and 6 can be provided equally as well though not shown in FIGURES 7 and 8 for clarity due to showing of other detailed structure in a location intermediate the separately hinged pivotal members 130 each of which can terminate in a lower end 138 as a final guide for placement of wiring substantially evenly into stator slots.

It is to be noted that each stop portion 133 integral with the triangular main body portion 131 of each pivotable or wing-like member is adapted to be located immediately adjacent to an inner periphery of the slotted stator means so as to avoid displacement of the pivotable members 130 unless the winding head structure shifts away from engagement with the slotted stator means. As the winding head structure is shifted away from the slotted stator means, it is possible for the wiring per se to effect inward camming of the wing-like pivotable members 130 which can be displaced laterally toward each other thereby avoiding possible disengagement of wire previously placed into the slots such as 77. Thus, the improved slot fill in part is due to the fact that the wire guiding end portions equipped with such pivotal members will have resilience accomplished by placing a spring means 139 under tension. The ends 138 are normally biased laterally outwardly and away from each other due to provision of such spring means 139 attached at opposite ends to the triangular main body portions 131 in locations adjacent to the stops 132. Resilience of the coil spring means 139 is such that each of the pivotable members 130 can be temporarily displaced against bias of this spring means 139 thereby avoiding dislocation of any wire previously properly placed into a particular slot or pair of slots.

While the embodiments of the present invention constitute preferred forms, it is to be understood that other forms might be adopted.

What is claimed is as follows:

1. In a polyphase stator winding appartus including a cantilever supported winding head structure having a snorkel member with an axial wire passage and a wire guiding shoe portion pivotally connected to said snorkel member in a spaced relationship from said winding head structure with said wire guiding shoe portion being movable toward and retractable from a magnetic stator core during progressive placement of wire conductors into slots of said core, and interlocking means selectively interconnecting said winding head structure and said wire guiding shoe portion comprising, a recessed area within one of the adjacently spaced surfaces of said winding head structure and said wire guiding shoe portion, and a movable pin means aligned with said recessed area and projecting from the other of said adjacently spaced surfaces, the projecting end of said pin means being receivable within the recessed area and engageable therewith to restrain lateral turning movement of the wire guiding portion about the pivotal support when the wire guiding portion is retracted from the slots of said stator core.

2. The interlocking means of claim 1 wherein the said recessed area is located in the spaced apart surface of the wire guiding shoe portion and the projecting end of said movable pin means is slidably suspended from a fixed location through said winding head structure and upon retraction of said winding head structure, said projecting end slides into engagement with the recessed area and the weight of said pin means maintains the engagement.

3. The interlocking means of claim 1 wherein said recessed area is located adjacent to one end of said wire guiding shoe portion and said movable pin means is suspended from an offset bracket member having wire guiding eyelet means to direct the wire material to the snorkel member, said pin means having an enlarged head with said bracket located between said head and said projecting end and said bracket member has a predetermined position relative to said recessed area so that said pin disengages said recessed area at predetermined location of said wire guiding shoe portion adjacent the slots of said stator.

4. The interlocking means of claim 1 wherein said recessed area is included in the adjacently spaced surface of said winding head and said pin means includes a first rack member engaging a gear means journaled within a passage through said shoe portion with a spring-biased second rack member engaging said gear substantially parallel to said first rack member, whereby movement of the second rack member simultaneously translates opposite movement to said pin means so that upon engagement of said second rack member with said stator core said pin means is disengaged from said recessed area.

5. The apparatus of claim 1 wherein the snorkel member of said winding head structure is chain-driven through a sprocket means and said snorkel member provides the sole support between said winding head structure and said wire guiding shoe portion.

References Cited by the Examiner

UNITED STATES PATENTS

| | | | |
|---|---|---|---|
| 2,954,177 | 9/1960 | Larsh et al. | 242—1.1 |
| 2,988,291 | 6/1961 | Greene et al. | 242—1.1 |
| 3,025,008 | 3/1962 | Nill et al. | 242—1.1 |

FRANK J. COHEN, *Primary Examiner.*

MERVIN STEIN, D. E. WATKINS, *Assistant Examiners.*